US009009107B2

(12) United States Patent
Kuo

(10) Patent No.: US 9,009,107 B2
(45) Date of Patent: Apr. 14, 2015

(54) OBJECT-SHARING SYSTEM, METHOD AND NON-TRANSITORY COMPUTER READABLE STORAGE MEDIUM FOR STORING THE METHOD FOR MAINTAINING HIERARCHICAL NAMING CONTEXTS IN OBJECT SHARING SYSTEM

(71) Applicant: Institute for Information Industry, Taipei (TW)

(72) Inventor: Yen-Hung Kuo, Taipei (TW)

(73) Assignee: Institute for Information Industry, Taipei (TW)

( * ) Notice: Subject to any disclaimer, the term of this patent is extended or adjusted under 35 U.S.C. 154(b) by 78 days.

(21) Appl. No.: 13/705,188

(22) Filed: Dec. 5, 2012

(65) Prior Publication Data

US 2014/0156594 A1 Jun. 5, 2014

(51) Int. Cl.
*G06F 17/30* (2006.01)
*G06F 7/00* (2006.01)

(52) U.S. Cl.
CPC .... *G06F 17/30174* (2013.01); *G06F 17/30067* (2013.01)

(58) Field of Classification Search
CPC .............. G06F 17/30575; G06F 17/30067; G06F 17/30017; G06F 17/30029; G06F 17/30053; G06F 21/6218
USPC ................................................. 707/620, 828
See application file for complete search history.

(56) References Cited

U.S. PATENT DOCUMENTS

| 7,130,880 | B1 | 10/2006 | Burton et al. | |
|---|---|---|---|---|
| 7,783,665 | B1 | 8/2010 | Tormasov et al. | |
| 7,885,925 | B1 | 2/2011 | Strong et al. | |
| 8,140,506 | B2 | 3/2012 | Pennington | |
| 8,181,117 | B2 | 5/2012 | Bruce et al. | |
| 2003/0149934 | A1* | 8/2003 | Worden | 715/513 |
| 2010/0299694 | A1* | 11/2010 | Lee | 725/25 |
| 2013/0073902 | A1* | 3/2013 | Davis et al. | 714/15 |
| 2013/0282785 | A1* | 10/2013 | Besen et al. | 709/201 |

FOREIGN PATENT DOCUMENTS

TW 442736 B 6/2001

* cited by examiner

*Primary Examiner* — Sherief Badawi
*Assistant Examiner* — Raquel Perez-Arroyo
(74) *Attorney, Agent, or Firm* — CKC & Partners Co., Ltd.

(57) ABSTRACT

An object-sharing method used in a object sharing system is provided. The object-sharing method comprises the steps outlined below. An object-sharing request that intends to share an object in a first object storage to a second object storage is received. First and second object paths are compared. Whether a naming conflict condition occurs is determined. The second object storage receives the object and keeps the first object path when the naming conflict condition does not occur. The second object storage receives the object and merges the first and the second object paths when the naming conflict condition occurs and the first and the second object storages are from the same user. An alternative sharing destination is generated to receive the object when the naming conflict condition occurs and the first and the second object storages are not from the same user.

20 Claims, 5 Drawing Sheets

OBJECT-SHARING SYSTEM, METHOD AND NON-TRANSITORY COMPUTER READABLE STORAGE MEDIUM FOR STORING THE METHOD FOR MAINTAINING HIERARCHICAL NAMING CONTEXTS IN OBJECT SHARING SYSTEM

BACKGROUND

1. Technical Field

The present disclosure relates to object-sharing technologies. More particularly, the present disclosure relates to an object sharing system, method and non-transitory computer readable storage medium for storing the method.

2. Description of Related Art

The ubiquity of computers and other digital devices like mobile smart phones and tablets are enabling digital data storage technologies to gradually replace conventional information preservation methods that traditionally use writing or printing, paper and physical storage. The advantage of digital data storage includes its convenient accessibility, large capacity and ability for long-term preservation of information. Also the rapid development of computer networks including the internet that can connect devices at almost anytime and anywhere make it easier to retrieve (download) and store (upload) information objects with high speed and reliability. Hence, the combination of digital data storage and globally accessible network communication have given rise to "cloud services" wherein users can store information artifacts (e.g. files) including such objects as e-mails, personal documents, photographs, audio and video recordings in "cloud services" that are provided by computers on the network and allow that information to be easily and quickly deposited, retrieved or shared with others. One particular form of sharing involves a process known as "synchronization" or "syncing" whereby information stored in a "cloud service" is copied (or replicated) either to or from one or more end-user accessible devices. Such "sync'ed" copies are made when devices are connected to the network and usually when the information in the "cloud service" or on a device is detected to have changed or is newly copied to or from a device. With this type of "synchronization" users may have access to information (copied to their device) even when the device is NOT connected to the network. Such "synchronization" is commonly used both by single users sharing information between multiple devices they own and use and/or multiple individuals sharing information for collaboration or communication. Typical "sync" implementations usually permit either individual files or collections of files (folders) to be designated as "shared".

However, when information is shared using this type of "synchronization" the process of copying the files is often complicated by the fact that the name of the object to be shared from a particular source, whether the object to be shared is a single file or a collection of files (a folder), is already in use at the sharing destination device. In most conventional "synching" implementations such naming "collisions" are usually resolved either by moving the copied object to a "special" location in the receiving devices storage naming hierarchy or by automatically renaming the object to be copied. However, such modification of the original name and hierarchy path may confuse end users and make information difficult to find and/or may eliminate valuable contextual clues about the nature of the information that is conveyed by the files location in the naming hierarchy.

Consequently, what is needed is a "synchronizing" object-sharing system, method and non-transitory computer readable storage medium for storing information that handles such naming conflicts and includes methods to efficiently maintain the original hierarchical naming contexts.

SUMMARY

An aspect of the present invention is to provide a sharing method for maintaining hierarchical naming contexts in an object or object sharing system. The method comprises the steps outlined below. An object- or file-sharing request is received that specifies an object having a particular first object path within the naming hierarchy of a first object storage is to be shared (copied) to a second object storage with its own second naming hierarchy and related paths. The first object path in the request and information about the users owning the object in both the first object storage and second object storage are compared with any existing similar object path in the second object storage. A naming conflict condition is detected when the first object path is the same as a path to an object or a file in the second object storage or when a prefix string of the first object path is the same as such a prefix string of the second object path. A naming conflict does not occur if the second object storage does not contain an object that matches the entire first object path and name or any prefix string of the first object path. If a naming conflict occurs and the owning user of the object in the first object storage matches the owning user information of the second object storage the object copied to the second object storage will retain the first object path and necessary (new) containers represented by the first object path will also be created on the second object storage. Essentially in the case where the owning user of both the first and second object storage is the same the naming hierarchy of the first file or object is preserved on the second object storage. If a naming conflict occurs where the owning users of the first object storage and the second object storage are not the same and any path prefix string in the first object storage matched a object path in the second object storage an alternative sharing destination (folder) will be generated in the second object storage to receive the object from the first object storage. In this case the first object path within the alternative sharing destination will be kept and necessary (new) containers represented by the first object path will also be created within the alternate destination (folder) on the second object storage.

Another aspect of the present invention is to provide a object sharing system. The object sharing system comprises a first object storage, a second object storage, a processing module and a comparing module. The processing module receives an object-sharing request that intends to share an object having a first object path in the first object storage to a second object storage, in which the second object storage has its own objects and paths. The comparing module compares the first object path and second object paths as well as information about the users that own objects in the first and the second object storage to determine whether a naming conflict condition occurs, in which the naming conflict condition occurs when the first object path is the same as the second object path or when a first prefix of the first object path is the same as a second prefix of the second object path. When the naming conflict condition does not occur, the processing module controls the second object storage to receive the object from the first object storage and keep the first object path. When the naming conflict condition occurs and the first object storage and the second object storage are from the same user, the processing module controls the second object storage to receive the object from the first object storage and merges an overlapped part of the first object path and the second object path. When the naming conflict condition occurs and the first object storage and the second object storage are not from the same user, the processing module generates an alternative sharing destination in the second object storage to receive the object from the first object storage to the alternative sharing destination and keeps the first object path in the alternative sharing destination.

Yet another aspect of the present invention is to provide a non-transitory computer readable storage medium to store a computer program to execute an object-sharing method used in an object-sharing system. The object-sharing method comprises the steps outlined below. An object-sharing request that intends to share an object having a first object path in a first object storage to a second object storage, in which the second object storage has a presented object having a second object path, is received. The first object path and the second object path are compared and user information of the first and the second object storage is compared. Whether a naming conflict condition occurs is determined, in which the naming conflict condition occurs when the first object path is the same as the second object path or when a first prefix of the first object path is the same as a second prefix of the second object path. The second object storage is controlled to receive the object from the first object storage and the first object path is kept when the naming conflict condition does not occur. The second object storage is controlled to receive the object from the first object storage and an overlapped part of the first object path and the second object path are merged when the naming conflict condition occurs and the first object storage and the second object storage are from the same user. An alternative sharing destination is generated in the second object storage to receive the object from the first object storage to the alternative sharing destination and the first object path in the alternative sharing destination is kept when the naming conflict condition occurs and the first object storage and the second object storage are not from the same user.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
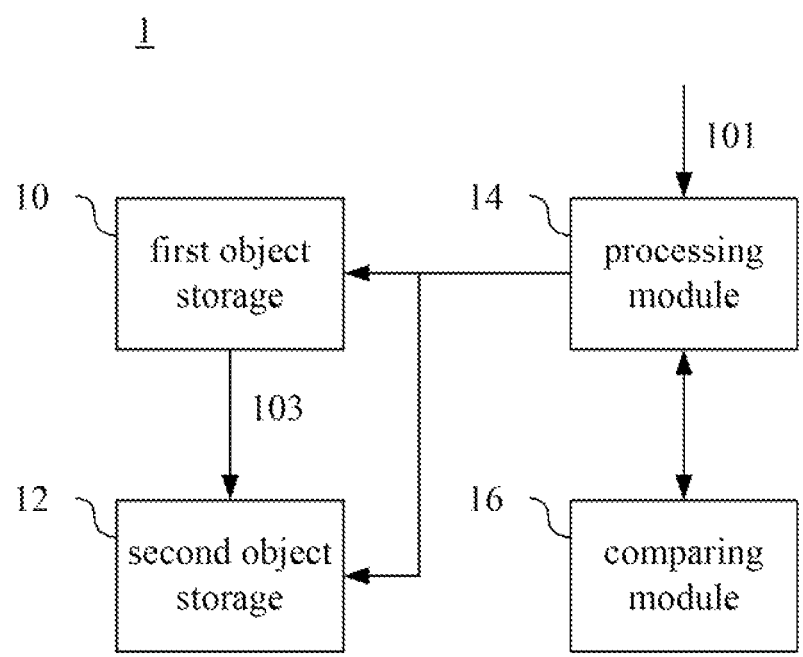
FIG. 1 is a block diagram of an object-sharing system in an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a block diagram of an object-sharing system 1 in an embodiment of the present invention. The object-sharing system 1 comprises a first object storage 10, a second object storage 12, a processing module 14 and a comparing module 16.

In an embodiment, the first object storage 10 and the second object storage 12 can be either two storages within the same cloud storage server that belong to two different users such that the object can be shared between different users. In another embodiment, the first object storage 10 can be located in a cloud storage server while the second object storage 12 is in a personal device, in which both the two storages belong two the same user, such that the user can share an object to himself/herself from the cloud storage server to the personal device. The personal device can be any electronic device having the object-syncing function, e.g. a tablet PC, a smart phone, a desktop computer and any other kinds of devices with Internet connection capability.

The processing module 14 receives an object-sharing request 101 in which in the present embodiment, the object-sharing request 101 intends to share an object 103 having a first object path in the first object storage 10 to a location having a second object path in the second object storage 12. In different embodiments, the object to be shared can be, but not limited to, a file or a folder. In different embodiments, the user of the first object storage can generate the object-sharing request 101 such that the processing module 14 deals with the object-sharing request. When both of the first object storage 10 and the second object storage 12 are in the same cloud storage server, the processing module 14 can be located in the cloud storage server. When the first object storage 10 is located in a cloud storage server and the second object storage 12 is in a personal device, the processing module 14 can be located in the second object storage 12.

The comparing module 16 compares the first object path and the second object path and user ownership information about the first object storage 10 and the second object storage 12 to determine whether a naming conflict condition occurs.

The first object path represents containment or a location within the hierarchical context of the file system in the first object storage 10 and may comprise one or more levels of folder and file names. Similarly, the second object path represents containment or a location within the hierarchical context of the file system of the second object storage 12 and may comprise one or more levels of folder and file names. To determine whether a naming conflict condition occurs, the comparing module 16 compares the first object path and the second object path and also compares user information to discover whether the first object storage 10 and the second object storage 12 are owned by the same user.

The naming conflict condition occurs when the first object path is the same as the second object path or when a prefix of the first object path is the same as the prefix of the second object path. For example, if the first object path is "/Folder A/Folder B/" and the second object path is "/Folder C/Folder D", in which A, B, C and Q are the names of the folders, the comparing module 16 determines that the naming conflict condition does not occur. However, if the first object path is "/Folder A/Folder B/" and the second object path is also "/Folder A/Folder B/", the comparing module 16 determines that the naming conflict condition occurs. In another example, when the first object path is /Folder A/File1/ and the second object path is /Folder A/File 2/, the comparing module 16 determines that because the prefix /Folder A matches the naming conflict condition occurs as well.

Figure 2:
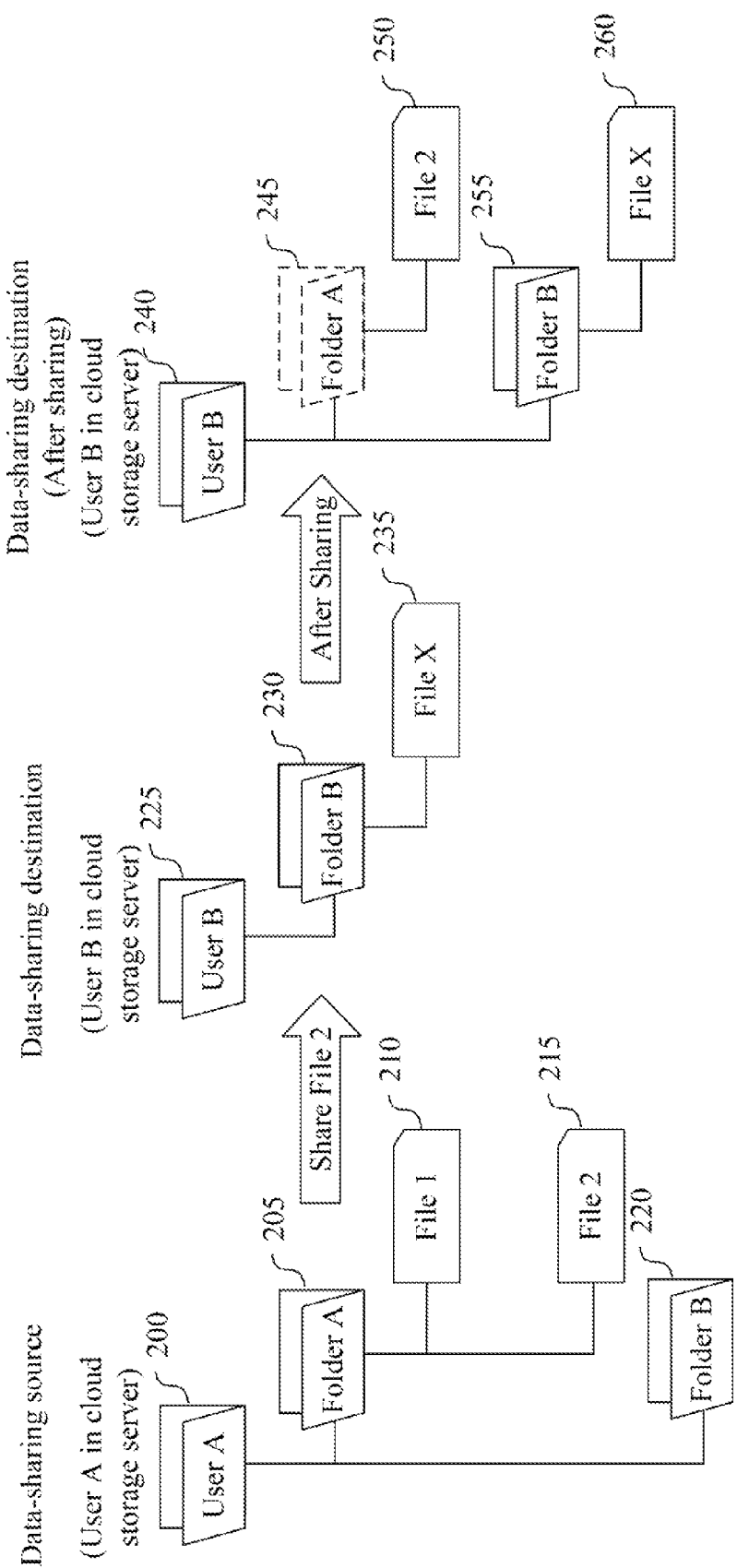
FIG. 2-4 are examples of hierarchical context of the object systems in the first object storage and the second object storage in different embodiments of the present invention.

FIG. 2 is a hierarchical context of the file systems in the first object storage and the second object storage in an embodiment of the present invention. In the present embodiment, both of the first object storage and the second object storage are located in the same cloud storage service, in which the first object storage belongs to user A and the second object storage belongs to user B.

Under the folder 200 indicated as "root" of user A (i.e. the folder labeled as "User A") there are two folders 205 labeled Folder A and 220 labeled Folder B respectively. The folder 205 labeled Folder A, which contains two files called File 1 (210) and File 2 (215) respectively. In the first object storage 10, folder 200, folder 205, folder 220, file 210 and file 215 are owned by user A. Under the folder 225 indicated as "root" of user B (i.e. the folder labeled as "User B"), there is one folder 230 labeled Folder B, which contains one file 235 called File X. In the second object storage 12, folder 225, folder 230, and file 235 are owned by user B.

When the file sharing system 1 receives the object-sharing request 101 that intends as shown in FIG. 2 to share File 2 (215) in Folder A (205) of the user A to the user B, FIG. 1 shows that the comparing module 16 compares the object paths of the first object storage and the second object storage according to the object-sharing request 101. It is noted that in the present embodiment, the comparison is only made on the folders under the root folder (i.e. under the folder of the user).

As shown in FIG. 2 since the object path of File 2 (215) to be shared is /Folder A/File 2/ and the object path of File X (235) in the second object storage is /Folder B/File X/, processing as shown in FIG. 1 indicated that the comparing module 16 will determine that the naming conflict condition does not occur. The processing module 14 then controls the second object storage to receive the object 103 corresponding to the object-sharing request 101 from the first object storage 10 to the second object storage 12 and keeps the first object path of the object 103.

Hence, as shown in the right most side of FIG. 2, the final hierarchical context of the file system in the second object storage 12 includes Folder A (245) having File 2 (250) and Folder B (255) having File X (260) at the same time. Though the user A shares File 2 (215) to the user B only, the hierarchical context of File 2 (215) is kept However, it is noted that though the user B can see Folder A (245) due to the maintenance of the hierarchical context of File 2 (215), the user B cannot access other contents of Folder A (245) other than File 2 (250) (e.g. File 1 (210)), which is the upper level folder of File 2 (215), if the authority setting of the first object storage 10 (user A) does not allow user B to access Folder A (205) In the final hierarchical context of the second object storage 12, folder 240, folder 255, and file 260 are owned by user B, the folder 245 and file 250 are owned by user A.

Figure 3:
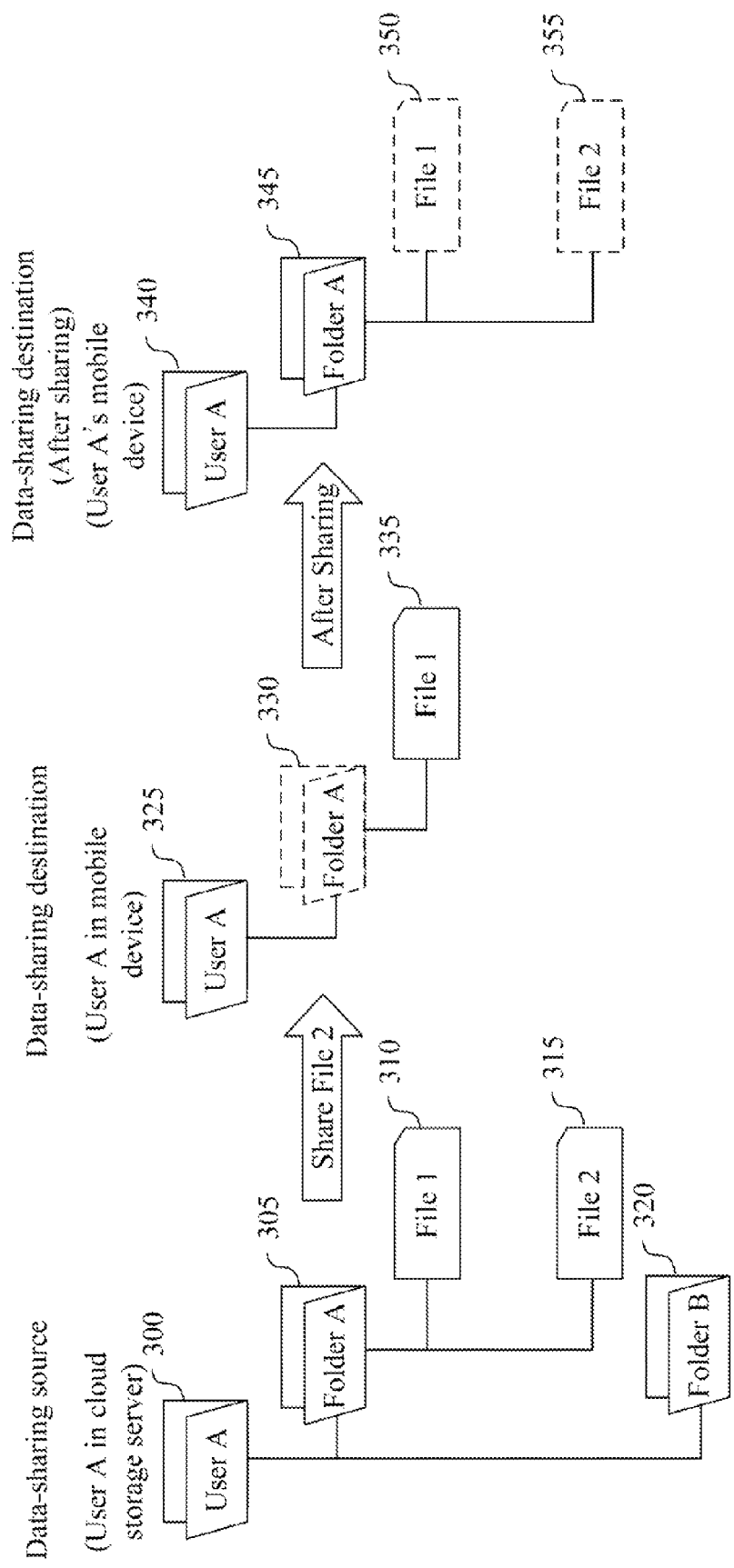
Figure 4:
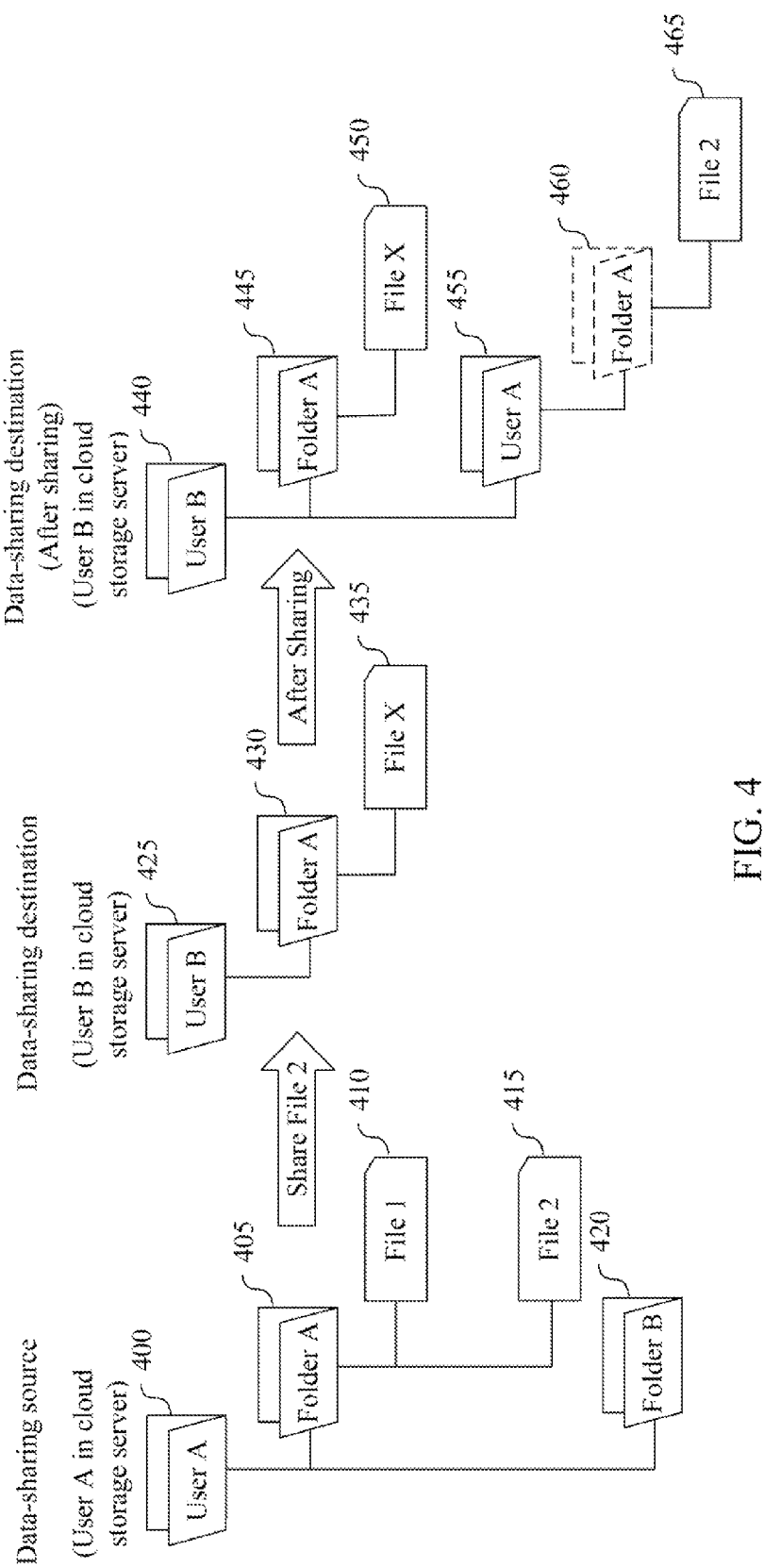

It is noted that when an object is shared somewhere within the hierarchy only that object and any containing object(s) will appear in the shared versions of the hierarchy, the object is said to be shared "explicitly" while containers that are created to preserve the hierarchical context are said to be shared "implicitly" When a container (e.g. a folder) itself is shared "explicitly", the contents of the container (files or folders) are said to be shared "implicitly." This also means that any new objects (files or folders) added to (or deleted from) an "implicitly" shared folder will be added to or deleted from the shared versions of the container accordingly. FIG. 2, FIG. 3, and FIG. 4, depict objects (files or folders) which are "explicitly" shared with by solid enclosing lines and "implicitly" shared objects enclosed in dashed lines.

Hence, in the current example as shown in FIG. 2, File 2 (250) is an "explicitly" shared file and Folder A (245) is an "implicitly" shared folder for user B.

FIG. 3 is a hierarchical context of the file systems in the first object storage 10 and the second object storage 12 in another embodiment of the present invention. In the present embodiment, the first object storage 10 is in a cloud storage service and the second object storage 12 is in a personal device, in which both of the first object storage 10 and the second object storage 12 belong to user A.

Under the folder (300) indicated as "root" of the cloud storage service of the user A (i.e. the folder labeled as "User A"), there are two folders called Folder A (305) and Folder B (320) respectively, in which there are two files called File 1 (310) and File 2 (315) respectively in Folder A (305). Under the folder indicated as "root" of the personal device of the user A, only one file "File 1" (335) is shared. Hence, File 1 (335) is an "explicitly" shared file and its container Folder A (330) is an "implicitly" shared folder. In the first file storage 10, folder 300, folder 305, folder 320, file 310, and file 315 are owned by user A. In the second object storage 12, folder 325, folder 330, and file 335 are also owned by user A.

As shown in FIG. 3, when the object sharing system 1 receives an object-sharing request 101 that intends to as depicted in FIG. 3 share File 2 (315) in Folder A (305) in the cloud storage server to the personal device, FIG. 1 shows that the comparing module 16 compares the file paths of the first object storage 10 and the second object storage 12 according to the object-sharing request 101.

Since the object path of the object to be shared in the first object storage 10 is /Folder A/File 2/ and the object path of the object in the second object storage 12 is /Folder A/File 1/, the comparing module 16 determines that the naming conflict condition occurs since the prefixes of the object paths in the first object storage 10 and the second object storage 12 are the same e.g. /Folder A. The comparing module 16 further compares the user information of the first object storage 10 and the second object storage 12. In the current example, since both the first object storage 10 and the second object storage 12 are owned to the same user (user A), the comparing module 16 determines that the first object storage 10 and the second object storage 12 are from the same user.

The processing module 14 merges the overlapped prefix of the first object path and the prefix of the second object path and then controls the second object storage 12 to receive the object 103 to the second object storage 12. The first object path of the object 103 can be kept because the prefixes of the first object path and the second object path are the same.

Hence, as shown in the right most side of FIG. 3, the final hierarchical context of the file system in the second object storage 12 includes Folder A (345) having both File 1 (350) and File 2 (355). In an embodiment, after the file-sharing process, the implicit shared folder A (330) becomes explicit shared folder A (345) and all objects under folder A (345) become implicit shared objects since all objects under folder A were explicit shared as shown in FIG. 3. In another embodiment, after the object-sharing process, the implicit shared folder A (330) is still an implicit shared object if there is any other object is not explicit shared to the same sharing destination. In either embodiment, all objects in the final hierarchical context of the file system in second object storage 12 are owned by user A.

FIG. 4 is a hierarchical context of the file systems in the first object storage 10 and the second object storage 12 in an embodiment of the present invention. In the present embodiment, the first object storage 10 and the second object storage 12 are in the same cloud storage service, in which the first object storage 10 belongs to user A and the second object storage 12 belongs to user B.

Under the folder (400) indicated as "root" of user A (i.e. the folder labeled as "User A") there are two folders called Folder A (405) and Folder B (420) respectively, in which there are two files called File 1 (410) and File 2 (415) respectively in Folder A (405). Under the folder (425) indicated as root of user B (i.e. the folder labeled as "User B"), there is only one folder 430 called Folder A as well, in which there is one file 435 called File X in Folder A (430) of the user B. In the first object storage 10, folder 400, folder 405, folder 420, file 410, and file 415 are owned by user A. In the second object storage 12, folder 425, folder 430, and file 435 are owned by user B.

As shown in FIG. 1 when the object sharing system 1 receives an object-sharing request 101 that as shown in FIG. 4 intends to share File 2 (415) in Folder A (405) of the user A to the user B, the comparing module 16 depicted in FIG. 1 compares the object paths of the first object storage 10 and the second object storage 12 according to the object-sharing request 101.

Since the object path of the object in the first object storage 10 is /Folder A/File 2/ and the object path of the presented object in the second object storage 12 is /Folder A/File X/, the comparing module 16 determines that the naming conflict condition occurs since the prefixes of the object paths in the first object storage 10 and the second object storage 12 are the same. The comparing module 16 further compares the owner information of the first object storage 10 and the second object storage 12. In the current example, since the first object storage 10 belongs to user A and the second object storage 12 belongs to user B, the comparing module 16 determines that the first object storage and the second object storage are not from the same user.

The processing module 14 generates an alternative sharing destination in the second object storage 12. In an embodiment, the processing module 14 is able to pop up a window on the display module (not shown) to notify the user B and allow the user B to create a new folder and decide the name of the new folder or choose another location (mounting point) in the name hierarchy of the file system of the second object storage 12 to avoid the naming conflict condition. In other embodiments, the processing module 14 is able to automatically generate the alternative sharing destination in the second object storage 12.

The processing module 14 further controls the second object storage 12 to receive the object from the first object storage 10 to the alternative destination in the second object storage 12 and keeps the first object path of the object 103 in the alternative destination.

In the present embodiment, the processing module 14 generates a new folder to receive the object in the second object storage 12. Hence, as shown in the right most side of FIG. 4, the final hierarchical context of the file system in the second object storage 12 includes user B's personal Folder A (440) having File X (445) and the new folder User A (455) containing an "implicitly" shared Folder A (460) from the first object storage 10 having the "explicitly" shared File 2 (465). In the final hierarchical context of the second object storage 12, the folder 440, folder 445, folder 455, and file 450 are owned by user B, the folder 460 and file 465 are owned by user A.

The object sharing system 1 of the present invention is able to keep the hierarchical context of the object to be shared to avoid the naming conflict condition. Hence, a flexible object organization at both the first object storage 10 and the second object storage 12 can be supported. Also, the consistent hierarchical context among different syncing devices can be maintained. Thus confusing situations can be resolved efficiently.

Figure 5:
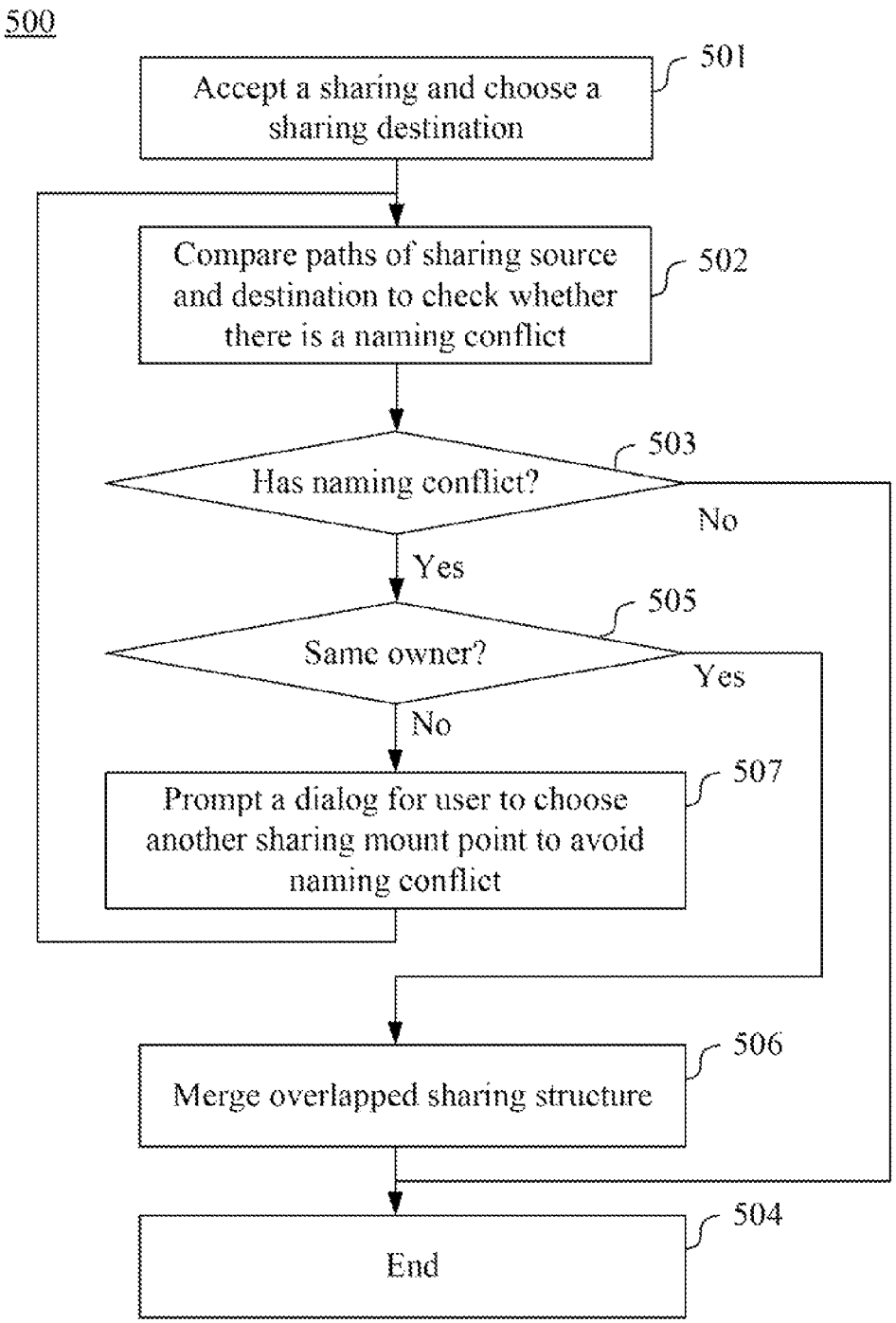
FIG. 5 is a flow chart of an object-sharing method in an embodiment of the present invention.

FIG. 5 is a flow chart of an object-sharing method 500 in an embodiment of the present disclosure. The object-sharing method 500 can be used in the object sharing system 1 depicted in FIG. 1. The computer program can be stored in a non-transitory computer readable medium such as a ROM (read-only memory), a flash memory, a floppy disc, a hard disc, an optical disc, a flash disc, a tape, an database accessible from a network, or any storage medium with the same functionality that can be contemplated by persons of ordinary skill in the art to which this invention pertains.

The object-sharing method 500 comprises the steps as outlined below.

In step 501, the object sharing system 1 from FIG. 1 accepts a sharing request 101 including a source (the first object storage) and destination (the second object storage).

In step 502, the comparing module 16 shown in FIG. 1 compares a first object path of the source object storage and a second object path of the destination to check whether there is a naming conflict.

In step 503, whether a naming conflict condition occurs is determined as described previously.

When the naming conflict condition does not occur, the processing module 14 from FIG. 1 controls the destination object storage to receive the object 103 from the source object storage and the flow finishes in step 504.

When the naming conflict condition occurs, the comparing module 16 depicted in FIG. 1 further determines whether the source object storage and the destination object storage are from the same user in step 505.

When the source object storage and the destination object storage are from the same user, the 14 processing module shown in FIG. 1 merges the overlapped path structure in step 506 such that the destination object storage receives the object 103 from the source object storage and the flow finishes in step 504.

When the source object storage and the destination object storage are not owned by the same user, the processing module 14 depicted in FIG. 1 prompts the user that owns the destination object storage with a dialog to choose another sharing location (mounting point) within the destination file system hierarchy to avoid the naming conflict in step 507.

It will be apparent to those skilled in the art that various modifications and variations can be made to the structure of the present invention without departing from the scope or spirit of the disclosure. In view of the foregoing, it is intended that the present disclosure cover modifications and variations of this disclosure provided they fall within the scope of the following claims.

What is claimed is:

1. An object-sharing method for maintaining hierarchical naming contexts in an object sharing system, comprising:
    receiving an object-sharing request that intends to share an object having a first object path in a first object storage to a second object storage, in which the second object storage has objects present that have second object paths;
    comparing the first object path and the second object paths and comparing user ownership information of the first and the second object storage, wherein the user ownership information is related to an authority setting of accessibility, and the first object path comprises a prefix from a root to a parent of the object to be shared; and
    determining whether a naming conflict condition occurs, in which the naming conflict condition occurs when the first object path is the same as the second object path or when a prefix of the first object path is the same as a prefix of the second object path;
    controlling the second object storage to receive the object from the first object storage and keep the first object path when the naming conflict condition does not occur;
    controlling the second object storage to receive the object from the first object storage and merging the overlapped, identical prefix of the first object path and the second object path when the naming conflict condition occurs and the first object storage and the second object storage are owned by the same user;

generating an alternative sharing destination in the second object storage to receive the object from the first object storage to the alternative sharing destination and keeping the first object path in the alternative sharing destination when the naming conflict condition occurs and the first object storage and the second object storage are not from the same user.

2. The object-sharing method of claim 1, wherein the step of comparing the first object path and the second object path further comprises comparing at least one level of first folder names of the first object path and at least one level of second folder names of the second object path.

3. The object-sharing method of claim 1, further comprising a step of accessing a content of an upper level folder of the object in the second object storage to be shared according to an authority setting of the first object storage.

4. The object-sharing method of claim 1, wherein the step of generating an alternative sharing destination further comprises renaming the object.

5. The object-sharing method of claim 1, wherein the step of generating an alternative sharing destination further comprises generating a new folder to receive the object to be shared.

6. The object-sharing method of claim 1, wherein the object is a file or a folder.

7. A object sharing system for maintaining hierarchical naming contexts comprising:
   a first object storage;
   a second object storage;
   a processing module for receiving an object-sharing request that intends to share an object having a first object path in the first object storage to a second object storage, in which the second object storage has a presented object having a second object path; and
   a comparing module for comparing the first object path and the second object path and comparing a user ownership information of the first and the second object storage to determine whether a naming conflict condition occurs, wherein the user ownership information is related to an authority setting of accessibility, and the first object path comprises a prefix from a root to a parent of the object to be shared, in which the naming conflict condition occurs when the first object path is the same as the second object path or when a first prefix of the first object path is the same as a second prefix of the second object path;
   wherein when the naming conflict condition does not occur, the processing module controls the second object storage to receive the object from the first object storage and keep the first object path;
   when the naming conflict condition occurs and the first object storage and the second object storage are from the same user, the processing module controls the second object storage to receive the object from the first object storage and merges an overlapped part of the first object path and the second object path;
   when the naming conflict condition occurs and the first object storage and the second object storage are not from the same user, the processing module generates an alternative sharing destination in the second object storage to receive the object from the first object storage to the alternative sharing destination and keeps the first object path in the alternative sharing destination.

8. The object sharing system of claim 7, wherein the comparing module compares the first object path and the second object path by comparing at least one level of first folder and object names in the first object path and at least one level of second folder and object names in the second object path.

9. The object sharing system of claim 7, wherein a content of an upper level folder of the object in the second object storage is accessed according to an authority setting of the first object storage.

10. The object sharing system of claim 7, wherein the processing module generates the alternative sharing destination by renaming the object.

11. The object sharing system of claim 7, wherein the processing module generates the alternative sharing destination by generating a new folder to receive the object.

12. The object sharing system of claim 7, wherein the object is a file or a folder.

13. The object sharing system of claim 7, wherein the first object storage and the second object storage are disposed in a cloud storage server.

14. The object sharing system of claim 7, wherein one of the first object storage and the second object storage is in a cloud storage server and the other one of the first object storage and the second object storage is in a mobile device.

15. A non-transitory computer readable storage medium to store a computer program to execute an object-sharing method for maintaining hierarchical naming contexts in a object sharing system, wherein the object-sharing method comprises:
   receiving an object-sharing request that intends to share an object having a first object path in a first object storage to a second object storage, in which the second object storage has a presented object having a second object path;
   comparing the first object path and the second object path and comparing a user ownership information of the first and the second object storage, wherein the user ownership information is related to an authority setting of accessibility, and the first object path comprises a prefix from a root to a parent of the object to be shared; and
   determining whether a naming conflict condition occurs, in which the naming conflict condition occurs when the first object path is the same as the second object path or when a first prefix of the first object path is the same as a second prefix of the second object path;
   controlling the second object storage to receive the object from the first object storage and keep the first object path when the naming conflict condition does not occur;
   controlling the second object storage to receive the object from the first object storage and merging an overlapped part of the first object path and the second object path when the naming conflict condition occurs and the first object storage and the second object storage are from the same user;
   generating an alternative sharing destination in the second object storage to receive the object from the first object storage to the alternative sharing destination and keeping the first object path in the alternative sharing destination when the naming conflict condition occurs and the first object storage and the second object storage are not from the same user.

16. The non-transitory computer readable storage medium of claim 15, wherein the step of comparing the first object path and the second object path further comprises comparing at least one level of first folder names of the first object path and at least one level of second folder names of the second object path.

17. The non-transitory computer readable storage medium of claim 15, wherein the object-sharing method further comprises a step of accessing a content of an upper level folder of the object in the second object storage to be shared according to an authority setting of the first object storage.

18. The non-transitory computer readable storage medium of claim 15, wherein the step of generating an alternative sharing destination further comprises renaming the object to be shared.

19. The non-transitory computer readable storage medium of claim 15, wherein the step of generating an alternative sharing destination further comprises generating a new folder to receive the object to be shared.

20. The non-transitory computer readable storage medium of claim 15, wherein the object is a file or a folder.

* * * * *